United States Patent
Park

(10) Patent No.: US 11,681,781 B2
(45) Date of Patent: Jun. 20, 2023

(54) SYSTEMS AND METHODS FOR CONTENT SECURITY

(71) Applicant: Comcast Cable Communications, LLC, Philadelphia, PA (US)

(72) Inventor: Kyong Park, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1046 days.

(21) Appl. No.: 15/901,491

(22) Filed: Feb. 21, 2018

(65) Prior Publication Data
US 2019/0258778 A1   Aug. 22, 2019

(51) Int. Cl.
*G06F 21/10* (2013.01)
*H04L 9/08* (2006.01)
*H04L 9/40* (2022.01)

(52) U.S. Cl.
CPC ............ *G06F 21/10* (2013.01); *G06F 21/105* (2013.01); *H04L 9/0819* (2013.01); *H04L 63/062* (2013.01); *H04L 63/10* (2013.01); *G06F 2221/0724* (2013.01); *H04L 2463/101* (2013.01)

(58) Field of Classification Search
CPC ............... G06F 21/10; G06F 21/105; G06F 2221/0724; G06F 2221/0753; H04L 63/062; H04L 63/10; H04L 9/0819; H04L 2463/101; H04L 2209/603; H04L 9/0841; H04L 9/3247; H04L 9/0894; H04L 9/088
USPC ........................................................ 713/171
See application file for complete search history.

(56) References Cited

U.S. PATENT DOCUMENTS

| | | | | |
|---|---|---|---|---|
| 6,550,011 | B1* | 4/2003 | Sims, III ............ | G11B 20/0071 380/279 |
| 7,266,691 | B1* | 9/2007 | Ishiguro ................... | G06F 21/10 380/278 |
| 8,074,083 | B1* | 12/2011 | Lee .......................... | G06F 21/10 713/194 |
| 8,332,950 | B2* | 12/2012 | Kitani .............. | G11B 20/00253 713/193 |
| 10,089,389 | B1* | 10/2018 | Van Rotterdam ... | G06F 3/04842 |
| 2003/0115147 | A1* | 6/2003 | Feldman .............. | G06Q 20/382 705/64 |
| 2003/0165241 | A1* | 9/2003 | Fransdonk ............. | G06Q 20/12 380/258 |
| 2003/0190044 | A1* | 10/2003 | Higashi ................... | G06F 21/10 705/57 |
| 2005/0187879 | A1* | 8/2005 | Zigmond .............. | H04L 9/0825 705/59 |
| 2007/0162753 | A1* | 7/2007 | Nakano ................. | H04L 9/0844 713/171 |
| 2007/0180496 | A1* | 8/2007 | Fransdonk ........... | G06Q 20/027 726/3 |

(Continued)

*Primary Examiner* — Aravind K Moorthy
(74) *Attorney, Agent, or Firm* — BakerHostetler

(57) ABSTRACT

Systems and methods are for content security may comprise transmitting a request for authorization to access secured content. A content key for the secured content may be received and stored to a restricted region of a memory. A device security module may have access to the restricted region and may decrypt, based on satisfaction of a use condition and using the content key, the secured content. An encryption key associated with a secure media system authorized to access the secured content may be received. The device security module may encrypt, using the encryption key, the secured content and route the secured content to the secure media system.

12 Claims, 7 Drawing Sheets

(56) References Cited

U.S. PATENT DOCUMENTS

| | | | |
|---|---|---|---|
| 2007/0203838 A1* | 8/2007 | Lee | G06F 21/10 |
| | | | 705/51 |
| 2007/0248231 A1* | 10/2007 | Kasahara | G06F 12/1416 |
| | | | 711/E12.098 |
| 2008/0148067 A1* | 6/2008 | Sitrick | G06F 21/10 |
| | | | 705/52 |
| 2008/0235140 A1* | 9/2008 | Read | G06F 21/10 |
| | | | 705/59 |
| 2012/0102215 A1* | 4/2012 | Catrein | H04L 9/0891 |
| | | | 709/231 |
| 2012/0303972 A1* | 11/2012 | Kuno | H04L 9/3263 |
| | | | 713/189 |
| 2012/0330939 A1* | 12/2012 | McCloskey | G06Q 30/02 |
| | | | 707/723 |
| 2013/0173919 A1* | 7/2013 | Jogand-Coulomb | H04N 21/4623 |
| | | | 713/168 |
| 2013/0219178 A1* | 8/2013 | Xiques | H04L 9/083 |
| | | | 713/168 |
| 2014/0052996 A1* | 2/2014 | Nin | G06F 21/10 |
| | | | 713/189 |
| 2016/0255535 A1* | 9/2016 | De Foy | H04L 67/2804 |
| | | | 370/236 |
| 2016/0364553 A1* | 12/2016 | Smith | G06F 21/105 |
| 2017/0005790 A1* | 1/2017 | Brockmann | H04L 63/06 |
| 2017/0104723 A1* | 4/2017 | Merritt | H04L 63/0281 |
| 2017/0195393 A1* | 7/2017 | Su | H04L 43/0888 |
| 2017/0249472 A1* | 8/2017 | Levy | G06F 21/6245 |
| 2018/0367540 A1* | 12/2018 | Miranda | H04L 63/061 |
| 2019/0121307 A1* | 4/2019 | Martinez Canedo | G06F 9/5044 |
| 2019/0182448 A1* | 6/2019 | Arana | H04N 5/76 |

* cited by examiner

SYSTEMS AND METHODS FOR CONTENT SECURITY

BACKGROUND

Digital content providers regularly demand higher content security measures. Device platforms and integrated content security frameworks evolve to meet the increasing content security standards. Content security measures may include end-to-end content protection, including digital rights enforcement and security measures for content on a user device. Digital rights enforcement and security measures for content on user devices may be performed by digital rights management (DRM) systems on user devices, such as a software-based systems. The DRM systems may be configured to make requests for access to secured content, such as to content distributors, based on content business rules or network protocols. The DRM systems may also be tasked with managing the use of content keys on user devices that allow access to the secured content on the user devices. Thus, not only must the DRM systems be re-engineered as content business rules and network protocols evolve, the DRM systems must frequently be re-engineered to keep pace with constantly evolving on-device content security measure requirements, media management systems, and digital content rights semantics. Additionally, while such DRM systems may be configured to manage receiving and processing of secured content, the systems may not be configured to manage local re-encoding, transcoding, sending, streaming, or storing of secured content. These and other shortcomings may be addressed by the present disclosure.

SUMMARY

System, apparatuses, and methods are described for digital rights enforcement and content security management on a device. Such systems, apparatuses, and methods may enable content key management to be de-coupled from secured content requests. For example, a device security module on the device may perform content key management and a digital rights management ("DRM") system on the device may make requests for the secured content. Content key management may comprise determining conditions for usage of the content key and decrypting the secured content using the content key, for example.

The device security module may be hardware-based, such as comprising a system on a chip ("SoC"). The device security module may be software-based, such as comprising a whitebox cryptographic module. The device security module may comprise a processor. The device security module may comprise a memory that stores the content key. The content key may be stored on a memory of the device or in a region of a memory of the device that may only be accessible by the device security module.

A method for content security—for content stored on a device, for example—may comprise sending a request to access secured content. Accessing secured content may comprise playing back, re-encoding, transcoding, sending, streaming, or storing the secured content, as examples. In response to the request, a license may be received. The license may be received by a computing device. The license may comprise a content key. The content key may be configured to decrypt the secured content. The license may comprise a use condition of the content key. The license may comprise instructions to route the license to a device security module of the computing device. The content key may be stored in a restricted memory or restricted region of a memory that may only be accessed by the device security module. The memory may be restricted to the device security module by circuitry that connects to the device security module and isolates the restricted memory from the rest of the device. The restricted memory may be protected by a password or encrypted and only the device security module may have the password or decryption key. The device security module may determine compliance with the use condition of the content key, such as based on one or more features of the computing device. Based on a determination that the computing device complies with the use condition or that the use condition is otherwise satisfied, the device security module may decrypt the secured content using the content key. After decrypting the secured content, the device security module may process the secured content.

A method for content security may comprise transmitting a request for authorization for a secure media system to access secured content. In response to the request, a key container may be received, such as by a computing device. The key container may comprise an encryption key associated with the secure media system. The key container may indicate a permission for the secure media system to access the secured content. A device security module of the computing device may decrypt the secured content using a content key. The content key may be accessible only to the device security module. The device security module may encrypt the secured content using the encryption key associated with the secure media system, so that only the secure media system may access the secured content. The device security module may route the secured content to the secure media system.

A method for content security may comprise a method for authorizing a media system to access secured content and enabling the authorized media system to securely access the secured content. A request to access secured content using a secure media system may be received, such as from a user device. The secure media system may be authenticated to access the secured content, such as by a computing device. If the secure media system is authenticated, a key container may be generated. The key container may comprise an encryption key associated with the secure media system. The key container may comprise an indication of a right of the secure media system to access the secured content. The key container may be transmitted to the user device.

BRIEF DESCRIPTION OF THE DRAWINGS

The following drawings illustrate generally, by way of example, but not by way of limitation, various examples discussed in the present disclosure. In the drawings.

DETAILED DESCRIPTION

Figure 1:
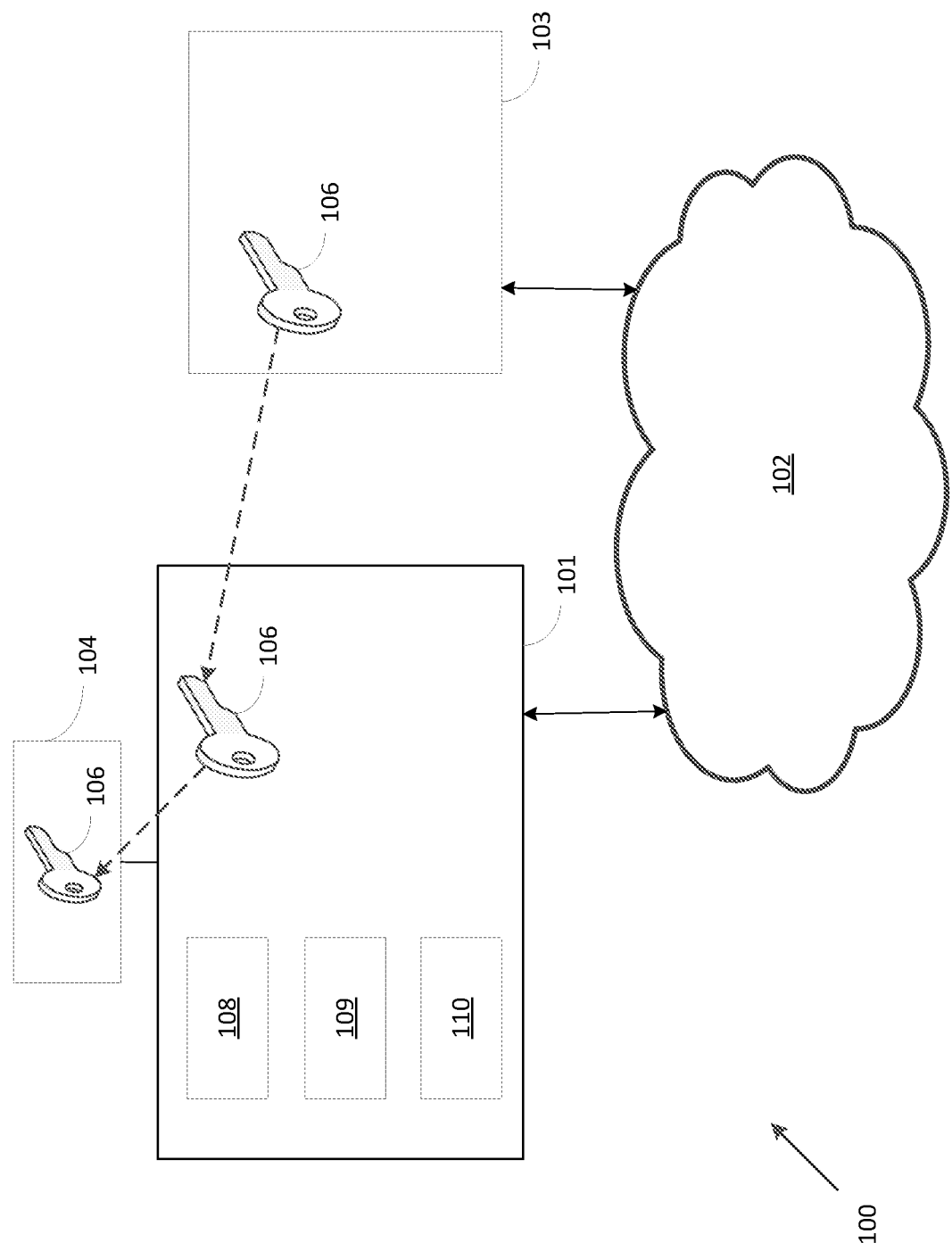
FIG. 1 shows an example system architecture.

Traditionally, digital rights enforcement on a device, such as the management of a content key, may as well as requests for secured content may be performed by a software-based digital rights management (DRM) system. The DRM system may need to be re-engineered as content business rules and network protocols evolve and to contend with evolving on-device content security measure requirements, media management systems, and digital content rights semantics. As an alternative, content key management on a device may be de-coupled from secured content requests. A device security module on the device may perform content key management and the DRM system may make requests for the secured content. Content key management may comprise determining conditions for usage of the content key and decrypting the secured content using the content key, for example.

The device security module may comprise hardware, such as a system on a chip ("SoC"). The device security module may comprise a processor, such as a microprocessor or a processor that is separate from or external to a main processor of the device. The device security module may comprise a memory that stores the content key. The content key may be stored on a memory of the device or in a region of a memory of the device that may only be accessible by the device security module. The memory or region of the memory may be restricted to the device security module by circuitry coupling the memory to the device security module. The memory or region of the memory may be restricted to the device security module by encryption of the contents stored on the memory or in the region of the memory. The device security module may be configured to decrypt the encrypted contents.

The device security module may perform on-device management of content keys. The content keys may be configured to decrypt or encrypt secured content. The device security module restrict, allow, or condition use of the content keys based on content rights expressions, such as from a content source.

Based on the system architecture of the computing device, the device security module may be configured to operate in conjunction with a software-based digital rights management (DRM) system of the computing device. For example, the device security module and the DRM system may each perform different, but complimentary, operations. The DRM system may be configured to manage communications with a provider of a license for secured content or a source of the secured content. For example, the DRM system may be configured to communicate with the license provider or content source based on content business rules or network protocols. The device security module may be agnostic to content business rules or network protocols. Therefore, the device security module may be interoperable among various DRM systems, such as DRM systems that use different content business rules, network protocols, or other proprietary protocols. The device security module may not be coupled to the DRM system's protocol stack. The device security module may and the DRM system may comprise different layers in a stack, such as a protocol stack, software stack, network stack, system (e.g., operating system) stack. For example, the device security module may be lower in a stack or stack than the DRM system. The DRM system or the device security module may each be in a physical, data link, transport, network, session, presentation, or application layer on the stack. The DRM system may be in a layer that transmits data to a layer of the device security module. The DRM system may be in a layer that receives data from a layer of the device security module. The DRM system and the device security module may each comprise an interface between layers of the stack, such as a media-to-transport interface or an application-to-transport interface.

The management of content security by the device security module may relieve the DRM system of the duty to enforce content rights. Relieved of the responsibility of content rights enforcement, the DRM system may evolve or may be maintained, independent of changes to content rights semantics or changes to security frameworks used to process secured content. The DRM system may manage secure network protocols and data transport. The DRM system may perform supporting roles in content rights management, including managing content key transport and communicating requests for content licenses and content keys to license providers.

The device security module may be updated. For example, if the device security module comprises hardware, firmware logic of the device security module may be updated. As another example, if the device security module comprises software, a software library or a whitebox library of the device security module may be updated. The device security module may be updated based on new content rights semantics or new content management or rights expressions or rules. For example, a library of content rights semantics or rights expressions or rules of the device security module may be updated. Assigning content security management to the device security module may mitigate the risk of improper implementation of a DRM system. Content keys may be isolated to the device security module, which may deter unauthorized release or access of content keys.

FIG. 1 shows an example system 100. The system 100 may generally allow a user of a user device 101 to access content from a network 102. Accessing the secured content may comprise playing back, re-encoding, transcoding, sending, streaming, or storing the secured content, as examples. The content may comprise data. The content may comprise digital content. The content may comprise a content asset. The content may comprise, for example, Internet content, audio content, video content, computer executable programs, data files, electronic books, still images, and audio files. The content may comprise over-the-top content (OTT). OTT content may comprise content from a third party delivered to an end user over the Internet. An internet service provider (ISP) may transport the contents, such as in packets, but the ISP may not perform rights and security management of the OTT content. Instead, the rights and security management of the OTT content may be performed on the user device 101.

The content may comprise secured content or unsecured content. Secured content may be similar to unsecured content, but secured content may comprise additional security features. For example, secured content may be encrypted, such as with an encryption algorithm or a key. Secured content may be associated with a key, such as a key configured to decrypt the secured content.

The user device 101 may comprise a computing device. The user device 101 may comprise a personal computer, such as a desktop computer, a laptop computer, a tablet device, or a gateway device. The user device 101 may comprise a mobile phone or a personal data assistant. The user device 101 may comprise a set-top box or a television. The user device 101 may comprise a digital video recorder. The user device 101 may comprise an Internet of Things ("IoT") device, such as an item with connectivity or computing capabilities. The user device 101 may comprise a client device. For example, the user device 101 may comprise a client device associated with a digital rights management system (DRM) server.

The user device 101 may be connected to the network 102. The network 102 may comprise a communication network, such as the Internet. The network 102 may comprise a content delivery network. The network 102 may comprise a physical structure, such as a coaxial cable network, a fiber optic cable network, a hybrid fiber (coax and fiber) cable network, a telephone (land or cellular) network, and a satellite network.

One or more licensing endpoints 103 may be connected to the network 102. The licensing endpoint 103 may comprise one or more computing devices. The licensing endpoint 103 may comprise a node. The node may comprise a node in a network of nodes. The licensing endpoint 103 may comprise a license server associated with a content licensing system. The licensing endpoint 103 may be associated with a content provider or a content distributor.

The licensing endpoint 103 may authenticate a device, such as the user device 101, over the network 102. For example, the licensing endpoint 103 may authenticate the user device 101 in response to a request for secured content. The licensing endpoint 103 may authenticate the user device 101 to determine whether to release secured content or the content key 106 to the user device 101. Authenticating the user device 101 may comprise determining whether the user device 101 has rights to the secured content. Authenticating the user device 101 may comprise determining whether the user device 101 is a trusted device, such as a device that comprises content security features. Authenticating the user device 101 may comprise receiving an authentication mechanism from the user device 101, such as an identifier, a token, a digital signature, or a digital certificate. The licensing endpoint 103 and the user device 101 may establish a secure communication session, such as by performing secure sockets layer (SSL) or transport layer security (TLS) negotiation.

The licensing endpoint 103 may release the content key 106 to the user device 101. The licensing endpoint 103 may release the content key 106 in response to the request from the user device 101. Releasing the content key 106 may comprise transmitting the content key 106 or allowing access to the content key 106, such as at a storage location.

The user device 101 may comprise or be coupled to a device security module 104. The device security module 104 may be configured to manage content on the user device 101, including content stored, received, or accessed by the user device 101. The device security module 104 may comprise a hardware implemented security module, such as a System on Chip ("SoC") or a secured processor 108 of the user device 101. The device security module 104 may comprise a portable device, such as a portable device external to the user device 101. The portable device may comprise an interface configured to be coupled to the user device 101. The interface may comprise a universal serial bus ("USB"), ISO-7816 (smart card), IEEE-1394 (Fire Wire), payment card industry ("PCP"), PCI Express, Ethernet, or another interface format. The device security module 104 may comprise a software implemented security module, such as a Whitebox Software-Based Cryptographic Module.

The device security module 104 may comprise secure processing capabilities. The device security module 104 may comprise a device security module processor. The device security module processor may comprise a microprocessor or a programmable logic circuit. The device security module processor may be configured to execute instructions stored on a memory. The device security module 104 may comprise the memory. The memory may comprise a FLASH memory, a dynamic random-access memory (DRAM) memory, or another type of memory, for example. The device security module 104 may comprise or control a region of a memory 110 of the user device 101, such as within the processor 108 of the user device 101. For example, the device security module 104 may comprise a system on a chip (SoC) that controls the region of the memory 110. The region of the memory 110 may not be shared with other systems of the user device 101. The device security module 104 may be integrated in a board of the user device 101 such that it may have access to a region of the memory 110, such as a restricted region of the memory 110. The restricted region of the memory 110 may be physically protected. For example, the restricted region of the memory 110 may not have circuitry to the rest of the user device 101. The restricted region of the memory may be password-restricted, such that a predetermined password must be used to access contents of the secure region of the memory 110. The device security module 104 may comprise or control an unsecured or unrestricted region of the memory 110. Contents of the region of the memory 110 may be encrypted, such as with an encryption algorithm. A decryption key to decrypt the contents of the region of the memory 110 may be coded into an operating code of the device security module 104.

The device security module 104 may be configured to manage one or more keys associated with secured content, such as the content key 106 at the user device 101. The content key 106 may be associated with secured content. The content key 106 may be configured to decrypt secured content. The content key 106 may comprise a key container. The key container may comprise an encryption of the content key 106. The device security module 104 may have access to a secret key configured to decrypt the content key 106. The content key 106 or the secret key may be isolated to the device security module 104. For example, the device security module 104 may comprise a blackbox. The internal workings of the blackbox may be opaque to other systems of the device or obfuscated. The blackbox may be viewed in terms of its inputs and outputs. The content key 106 may be isolated to the blackbox. The device security module 104 may comprise an application programming interface (API) that does not expose the content key 106. If the device security module 104 comprises or controls a region of the memory 110 of the user device 101, the content key 106 or the secret key may be isolated to the region of the memory 110.

Alternatively or in addition, the device security module 104 may be implemented using white box protection technology. The device security module 104 may use a shared region of the memory 110. For example, the device security module 104 may scramble an algorithm. The device security module 104 may scramble the content key 106 or the secret key by the same or a similar method as that used to scramble the algorithm. When another system accesses the shared region of the memory 110, the other system may not be able to use the content key 106 or the secret key because the content key 106 or the secret key has been scrambled.

The content key 106 may comprise instructions. The instructions may comprise rights metadata or semantics, such as one or more mandates or conditions for use of the content key 106. For example, conditions may comprise a requirement that the user device 101 comprise specific hardware or software in order to use the content key 106. The conditions may require that the user device 101 comprise a minimum version of hardware or software in order to use the content key 106. The conditions may require that the content key 106 or the secured content remain in a processor 108 of the user device 101. The conditions may require that the content key 106 or the secured content remain in a restricted memory of the user device 101. The conditions may require an output protection type or minimum version of an output protection type for the secured content, such as High-Bandwidth Digital Content Protection (HDCP) 2.2 standards.

The instructions may comprise an expression of a right. The right may be to use the content key 106. The right may be to access the secured content. Accessing secured content may comprise playing back, re-encoding, transcoding, sending, streaming, or storing the secured content, as examples. The instructions may be created by a content creator, a content distributor, or a content licensing authority, for example.

If the content key 106 is encrypted, the device security module 104 may be configured to decrypt the content key 106 using the secret key. The device security module 104 may be configured to identify, determine, enforce, or extract the instructions from the secured structure of the key container of the content key 106. The device security module 104 may be configured to enforce the instructions. The device security module 104 may be configured to determine satisfaction of the instructions. For example, the device security module 104 may be configured to determine satisfaction of the instructions by the user device 101. The device security module 104 may be configured to restrict use of the content key 106, such as in accordance with the instructions. For example, the device security module 104 may restrict use of the content key 106 if the device security module 104 determines that one or more conditions or mandates have not been satisfied.

The user device 101 may comprise a digital rights management (DRM) system 109. The DRM system 109 may comprise software. The DRM system 109 may comprise a DRM client. The DRM system 109 may comprise an Application Programming Interface (APIs). The DRM system 109 may comprise objects that enable management of DRM operations on the user device 101. For example, the DRM system 109 may comprise any of Widevine, Fairplay, and PlayReady. The DRM system 109 may comprise a native DRM of the user device 101. A native DRM may comprise a DRM that is pre-integrated into a viewing platform of the user device 101. The DRM system 109 may comprise a DRM installed on the user device 101. The DRM system 109 may comprise a plurality of DRM systems, such as one or more native DRMs and one or more installed DRMs.

The DRM system 109 may be configured to communicate with the licensing endpoint 103, such as based on content business rules or network protocols. For example, the DRM system 109 may be configured to request a license or the content key 106 to access secured content from the licensing endpoint 103. Accessing secured content may comprise playing back, re-encoding, transcoding, sending, streaming, or storing the secured content, as examples. The license may comprise an expression of rights to access the secured content. The DRM system 109 may be configured to receive a license or the content key 106. The DRM system 109 may be configured to route the content key 106 to the device security module 104. The DRM system 109 or the device 101 may save the license or the content key 106 to the memory 110 of the user device 101 or to a memory of the device security module 104. An API may route the content key 106 from the DRM system 109 to the device security module 104. The API may indicate to the device security module 104 that the content key 106 may be accessed from the memory 110.

Figure 2:
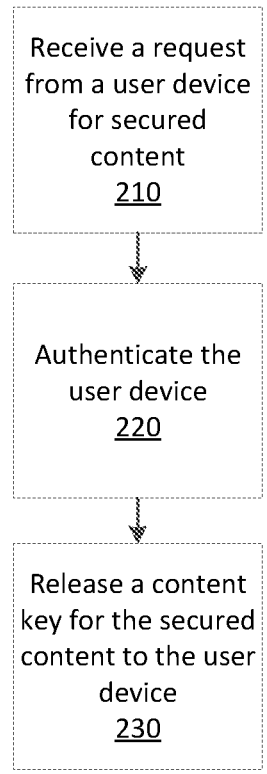
FIG. 2 shows a flow diagram of an example method.

FIG. 2 shows an example method. At step 210, a request may be received. The request may be received at a computing device, such as the licensing endpoint 103 in FIG. 1. The request may be received via a network (e.g., the network 102 in FIG. 1). The request may be received from a user device (e.g., the user device 101 in FIG. 1). The request may be received from a DRM system (e.g., the DRM system 109 in FIG. 1) or from a device security module (e.g., the device security module 104 in FIG. 1). The request may comprise a request for secured content. The request may comprise a request to access the secured content. The request may comprise a request for a content key associated with the secured content (e.g., the content key 106 in FIG. 1). The request may comprise a request for a license for the secured content.

The request may be transmitted in response to an attempt to access the secured content on the user device or on a device in communication with the user device. For example, the request may be transmitted in response to a user of the user device attempting to play a protected file in a media player application on the user device. The request may be transmitted in response to the user of the user device interacting with a license provider. For example, the user may access a webpage associated with the license provider. The user may provide payment to the license provider in exchange for access to the secured content. The request may comprise a request for license pre-delivery. For example, if the user of the user device subscribes to a content service, requests may be transmitted periodically for licenses for content associated with the service. The request may be transmitted before the secured content is available.

The request may comprise an indication of the secured content. The request may comprise identification information associated with the user device. The request may comprise identification information associated with the device security module of the user device. The request may comprise identification information associated with the DRM system of the user device. The request may comprise identification information associated with the user of the user device. Identification information may comprise a unique identifier, a number, a version, a model, a location, or an account, for example.

The request may comprise an authentication mechanism. The authentication mechanism may be associated with the user device or a component of the user device, such as the device security module or the DRM system. The authentication mechanism may be associated with the user of the user device. The authentication mechanism may comprise a digital signature of the user device or the component of the user device. The digital signature may comprise a value hashed with a private key or data encrypted with the private key. The private key may comprise a key that is associated with the user device or the component of the user device. The private key may only be known or accessed by the user device or the component of the user device. The private key may be paired to a public key. The public key may be publicly known and may be configured to decrypt data that has been encrypted using the private key. The authentication mechanism may comprise a digital certificate, a token, or an identifier.

At step 220, the user device may be authenticated. The component of the user device, such as the DRM system or the device security module, may be authenticated. The user device or the component of the user device may be authenticated in response to the request in step 210. For example, the computing device that receives the request in step 210 may authenticate the user device or the component of the user device.

The user device may be authenticated to determine whether to release the secured content or the content key to the user device. The user device may be authenticated to determine whether to grant the user device rights to the secured content. Authenticating the user device may comprise determining whether the user device has rights to the secured content. Authenticating the user device may comprise determining whether the user device is a trusted device, such as a device that comprises content security features. The user device may be authenticated using the identification information. For example, the user device may be authenticated by comparing the identification information to a database of authenticated users, user devices, or user device components.

The user device may be authenticated using the authentication mechanism. For example, if the authentication mechanism comprises a value or data that has been hashed or encrypted with the private kay of the user device or the user device component, the value or data may be decrypted with the public key. Successful decryption with the public key may indicate that the user device or device component is in possession with the private key and thus is the entity associated with the private key and the paired public key. A database of authorized devices or device components may comprise keys associated with the authorized devices or components. The database may be referenced or queried to determine if the list of keys comprises the public key of the user device or device component. If the database comprises an indication of the public key, it may be determined that the request came from an authorized device or device component. A secure communication session may be established with the user device, such as by performing secure sockets layer (SSL) or transport layer security (TLS) negotiation.

At step 230, a content key may be released to the device. The content key may be released from the computing device that received the request in step 210 or the computing device that authenticated the user device in step 220. The content key may be released to the device in response to or based on the authentication of the user device in step 220. The content key may be associated with the secured content requested in step 210. The content key may be configured to decrypt the secured content.

Releasing the content key may comprise transmitting the content key. The license may be transmitted over the network. The content key may be made available for access at a storage location, such as at a database, a server, or a cache. The content key may be made available for download at the storage location. The content key may comprise a key container. The key container may comprise an encryption of the content key. For example, the key container may comprise an encryption of the content key with a public key of the user device or the device security module. The key container may be configured for secure transport of the content key to the user device or the component of the user device.

The key container may comprise metadata. The metadata may comprise instructions. The instructions may comprise instructions to route the key container to the device security module. The instructions may comprise instructions to save the key container to a memory, such as a memory of the user device or the device security module. The metadata may comprise a license or an expression of a right to the secured content, such as of rights granted to the user device or device component to access or process the secured content. The metadata may comprise an expression of rights to the content key. The metadata may comprise an expression of rights to access the secured content. Accessing secured content may comprise playing back, re-encoding, transcoding, sending, streaming, or storing the secured content, as examples. The metadata may comprise conditions for use of the content key. For example, the conditions may comprise a requirement that the user device comprise specific hardware or software in order to use the content key. The conditions may require that the user device comprise a minimum version of hardware or software in order to use the content key. The conditions may require that the content key or the secured content remain in a secured content path, such or in the device security module, in a restricted memory, or in a secured processor. The conditions may require an output protection type or minimum version of an output protection type for the secured content, such as High-Bandwidth Digital Content Protection (HDCP) 2.2 standards.

The secured content may be released to the user device. The secured content may be transmitted to the user device. For example, the secured content may be transmitted as an encrypted data file to the user device. The secured content may be transmitted to the user device as an encrypted stream of data. The stream may comprise encrypted content packets. The secured content may comprise a header comprising a value or code that identifies the content as secured. The secured content may be stored at location where the user device may access the secured content, such as on a server, a database, or a cache.

As an illustrative example, a licensing server may receive a request from a laptop computer to view a recorded soccer match. The licensing server may receive the request over a content distribution network associated with the licensing server. The request may comprise an authentication code. The message authentication code may comprise a code that is distributed to accounts that subscribe to a content subscription service. The server may authenticate the laptop computer by verifying that the provided message authentication code is correct. After authenticating the laptop computer, the licensing server may transmit a license to the laptop computer over the network. The license may comprise a content key. The content key may be configured to decrypt an encrypted video file comprising the recorded soccer match. The licensing server may transmit the encrypted video file comprising the recorded soccer match to the laptop computer.

Figure 3:
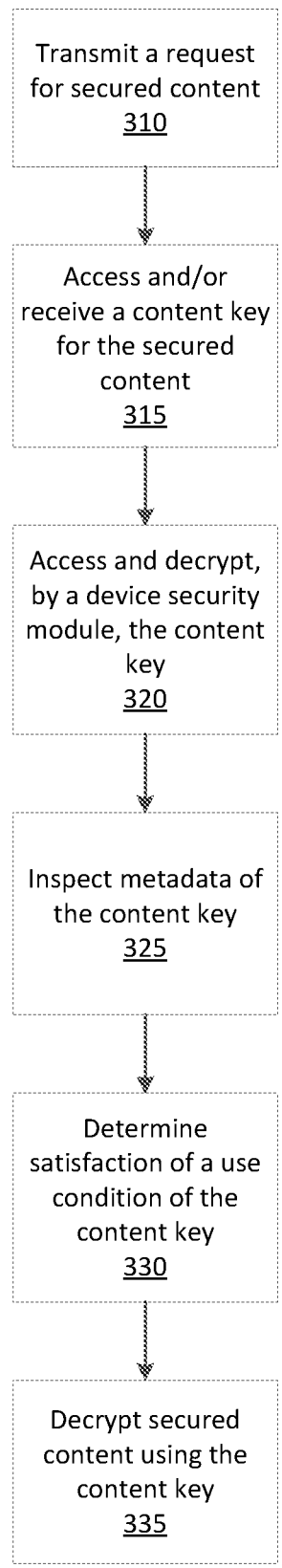
FIG. 3 shows a flow diagram of an example method.

FIG. 3 shows an example method. At step 310, a request for secured content may be transmitted. The request may be similar to the request received in step 210 in FIG. 2. The request may be transmitted by a user device (e.g., the user device 101 in FIG. 1). The request may be transmitted by a component of the user device, such as a DRM system (e.g., the DRM system 109 in FIG. 1) of the user device. The DRM system may transmit the request based on content business rules or network protocols. The request may be transmitted by a device security module (e.g., the device security module 104 in FIG. 1) of the user device. The request may be transmitted to a computing device, such as the licensing endpoint 103 in FIG. 1. The request may be transmitted via a network (e.g., the network 102 in FIG. 1). The request may comprise a request to access the secured content. Accessing the secured content may comprise playing back, re-encoding, transcoding, sending, streaming, or storing the secured content, as examples. The request may comprise a request for a content key associated with secured content (e.g., the content key 106 in FIG. 1). The request may comprise a request for a license for the secured content, such as an expression of rights to access the secured content.

The request may be transmitted based on an attempt to access the secured content, such as on the user device or on a device in communication with the user device. For example, the request may be transmitted based on the user of the user device attempting to play a protected file in a media player application on the user device. The request may be transmitted based on the user of the user device interacting with a license provider. For example, the user may access a webpage associated with the license provider. The user may provide payment to the license provider in exchange for access to the secured content. The request may comprise a request for license pre-delivery. For example, if the user of the user device subscribes to a content service, requests may be transmitted periodically for licenses for content associated with the service. The request may be transmitted before the secured content is available.

The request may comprise an indication of the secured content. The request may comprise identification information associated with the user device. The request may comprise identification information associated with the device security module of the user device. The request may comprise identification information associated with the DRM system of the user device. The request may comprise identification information associated with the user of the user device. Identification information may comprise a unique identifier, such as a name, a version, a model, a number, a location, or an account, for example.

The request may comprise an authentication mechanism. The authentication mechanism may be associated with the user device or a component of the user device, such as the device security module or the DRM system. The authentication mechanism may be associated with the user of the user device. The authentication mechanism may comprise a digital signature of the user device or the component of the user device. The digital signature may comprise a value hashed with a private key or data encrypted with the private key. The private key may comprise a key that is associated with the user device or the component of the user device. The private key may only be known or accessed by the user device or the component of the user device. The private key may be paired to a public key. The public key may be publicly known and may be configured to decrypt data that has been encrypted using the private key. The authentication mechanism may comprise a digital certificate, a token, or an identifier.

At step 315, the content key associated with the secured content may be received or accessed. The content key may decrypt the secured content requested in step 310. Accessing the content key may comprise retrieving the content key at a location where the content key is stored, such as a database, a server, or a cache. Accessing the content key may comprise receiving the content key from a computing device, such as the computing device that the request for the secured content was transmitted to in step 310. The content key may be received or accessed after the user device is authenticated, such as in step 220 in FIG. 2.

The content key may comprise a key container. The key container may comprise an encryption of the content key. For example, the key container may comprise an encryption of the content key with a public key of the user device or the device security module. The key container may be configured for secure transport of the content key to the user device or the component of the user device.

The key container may comprise metadata. The metadata may comprise instructions. The instructions may comprise instructions to route the key container to the device security module. The instructions may comprise instructions to save the key container to a memory, such as a memory of the user device or the device security module. The metadata may comprise an expression of a right to the secured content, such as of rights granted to the user device or device component to access or process the secured content. The metadata may comprise an expression of rights to the content key. The metadata may comprise an expression of rights to access the secured content. Accessing the secured content may comprise playing back, re-encoding, transcoding, sending, streaming, or storing the secured content, as examples. The metadata may comprise conditions for use of the content key. For example, the conditions may comprise a requirement that the user device comprise specific hardware or software in order to use the content key. The conditions may require that the user device comprise a minimum version of hardware or software in order to use the content key. The conditions may require that the content key or the secured content remain in a secured content path, such in the device security module, in a restricted memory, or in a secured processor. The conditions may require an output protection type or minimum version of an output protection type for the secured content, such as High-Bandwidth Digital Content Protection (HDCP) 2.2 standards.

The secured content may be accessed or received. The secured content may comprise data. The secured content may comprise digital content. The secured content may comprise a content asset. The secured content may comprise, for example, Internet content, audio content, video content, computer executable programs, data files, electronic books, still images, and audio files.

The secured content may comprise an encrypted data file. The secured content may be received by the device as an encrypted stream of data. The stream may comprise encrypted content packets. The packets may be received by the device. The secured content may be retrieved at a storage location such as a database, a server, or a cache. The secured content may comprise a header comprising a value or code that identifies the content as secured. The secured content may be accessed at a location where the secured content is stored, such as on a server, a database, or a cache.

At step 320, the content key may be accessed by the device security module. The DRM system of the user device or another component of the user device may route the content key to the device security module, such as based on routing instructions in the metadata of the content key. The device security module may receive an indication, such as a command or a request, to access the content key from the memory of the user device. The device security module may receive an indication that the content key is stored on the memory. In response to the indication, the device security module may access the content key from the memory. If the content key is encrypted, such as in the key container, the device security module may decrypt the content key. For example, the device security module may use an algorithm or a key to decrypt the content key. The key may comprise a secret key isolated to the device security module. For example, the device security module may comprise a blackbox. The internal workings of the blackbox may be opaque to other systems of the user device or may be obfuscated. The blackbox may be viewed in terms of its inputs and outputs. The content key or the secret key may be isolated to the blackbox. The device security module may comprise an application programming interface (API) that never exposes the content key. The device security module may comprise or control a region of the memory of the user device. The content key or the secret key may be isolated to the region of the memory.

Alternatively or in addition, the device security module may isolate the content key or the secret key from other components or systems by using whitebox protection technology. The device security module may use a shared region of the memory of the user device. The device security module may scramble an algorithm. The device security module may scramble the content key or the secret key by the same or a similar method as that used to scramble the algorithm. When another system accesses the shared region of the memory, the other system may not be able to use the content key 106 or the secret key because the content key 106 or the secret key has been scrambled.

At step 325, metadata of the content key, such as in the key container, may be inspected. The device security module may inspect the metadata. If the metadata comprises a rights expression, the rights expression may be inspected to determine that rights to the secured content or rights to use the content key were granted. If the metadata comprises a use condition of the content key, the use condition may be determined by the device security module.

At step 330, satisfaction of one or more use conditions of the content key may be determined. The device security module may determine satisfaction of the one or more use conditions. For example, the device security module may determine if the user device is of a type of device allowed to access the content by the use condition. The device security module may determine if the user device has hardware or software required by the use condition. The device security module may determine if the user device has a version of hardware or software, such as an updated version or a version that was released on or after a date, as may be required by the use condition. The device security module may determine if the user device implements a protocol, such as a content security protocol or a communication protocol, as may be required by the use condition. The device security module may restrict use of the content key based on whether the use condition is satisfied.

At step 335, the secured content may be decrypted using the content key. The device security module may use the content key to decrypt the secured content. The device security module may process the decrypted secured content. The device security module may decompress and decode the secured content. The device security module may access the decrypted secured content. Accessing the decrypted secured content may comprise playing back, re-encoding, transcoding, sending, streaming, or storing the decrypted secured content, as examples. The device security module may cause the secured content to be output, such as to an output of the user device or to an output coupled to the user device. An output of the user device or coupled to the user device may comprise, for example, a speaker, a display, a speaker, or another input/output device.

As an illustrative example, a user may browse, via a touchscreen on a mobile phone, a menu of media content on a mobile application. The user may select a music album from the menu. The user may input payment information for the music album. A DRM system on the mobile phone may transmit a request for the music album to a digital licensing server over a wireless network using a content business rule of the digital licensing server. The request may comprise information associated with the user's payment for the music album. The request may comprise an identifier of a device security module of the mobile phone. The device security module may comprise a toggle coupled to the mobile phone through an auxiliary (AUX) input.

The user may receive a notification, via the mobile phone, that the user may access the music album. The user may select, via the touchscreen, an option to access the music album such as by choosing a "play" icon or an "open" icon. The mobile phone may download an encrypted file comprising the music album. The file may be compressed and coded.

The mobile phone may download a license from the server over the network. The license may comprise a content key configured to decrypt the encrypted file. The content key may be encrypted. The content key may comprise conditions for use of the key, such a minimum version of a secured content processor. The license may comprise additional instructions, such as limitations on use of the content key. For example, the instructions may specify that only the portion corresponding to the first ten tracks of the music album, wherein the music album may comprise twelve tracks, may be decrypted with the content key.

The DRM system on the mobile phone may route the license to the device security module coupled to the mobile phone. The device security module may decrypt the license using a secret key of the device security module stored on a memory of the device security module. The device security module may inspect the content key. The device security module may determine whether conditions for use of the content key are satisfied. For example, the device security module may confirm that the mobile phone comprises a secured content processor that is at least the minimum version required by the content key instructions.

If the device security module determines that the conditions for use of the content key are satisfied, the device security module may decrypt the music album using the content key. The device security module may decrypt the music album according to the instructions. For example, the device security module may only decrypt the portion corresponding to the first ten tracks of the music album. The device security module may decrypt the music album to the secured content processor of the mobile phone. The secured content processor may decompress the compressed music album file. The device security module may decode the music album file. The secured content processor may process the music album file.

From the user's perspective, after selecting the "play" icon on the touchscreen of the mobile phone the user may listen to the album on the mobile phone. The user may listen to the album through an output of the mobile phone, such as speakers. The user may alternate between the first ten tracks; however the user may not play or listen to the last two of the twelve tracks of the album because they may not have been decrypted.

According to an aspect of the disclosure, a device security module may be configured to operate with a secure media system to manage local secured content access. Local access may comprise local playback, re-encoding, transcoding, sending, streaming, or storing the secured content, as examples. The secure media system may comprise a security framework or secure content environment. The secure media system may comprise a content management system, such as a content recording system. The secure media system may be software-based or hardware-based. The secure media system may comprise a device. The device may be in communication with the user device of the device security module. For example, the device may comprise a set-top box, a digital video recorder (DVR) device, a playback device, a block box device, a white box device, a portable media player device, a gateway device, or a user device. The secure media system may comprise a proprietary protocol, such as Apple AirPlay, Roku, Amazon Fire, or Google Cast protocols. The proprietary protocol may comprise a proprietary encryption, transcoding, or re-encoding protocol, for example.

The secure media system may be configured to transmit a request to an authorization endpoint for authorization to access secured content. The request may comprise a request to access specific secured content. The request may comprise a request to access secured content associated with the authorization endpoint in general. The authorization endpoint may comprise a computing device. The authorization endpoint may be like the licensing endpoint 103 in FIG. 1. The request may comprise metadata. The metadata may comprise information associated with a decryption and encryption protocol of the secure media system. The request may comprise an encryption key. The encryption key may be associated with the secure media system. The request may comprise an authentication mechanism, such as an identifier, a token, a digital signature, or a digital certificate of the secure media system.

The authorization endpoint may authenticate the secure media system. Authenticating the secure media system may comprise determining that the secure media system or an entity associated with the secure media system has rights or should have rights to access the secured content. Authenticating the secure media system may comprise requiring the security framework to perform a challenge or transmit a password, for example. Authenticating the secure media system may be based on the authentication mechanism transmitted in the request. For example, authenticating the security framework may be based on use of a private key or a public key, such as to encrypt the request, wherein the private key or the public key may be associated with or known by one or more entities that have been determined to be permitted to access the secured content. Authenticating the security framework may be based on a digital certificate, such as of the secure media system. The digital certificate may be issued by a trusted third party who authenticates the secure media system or verifies that the secure media system is associated with a particular entity. The digital certificate may be used to determine that the secure media system comprises a framework that is permitted to access the secured content.

The authorization endpoint may generate a key container or a secure transcription structure. The key container may comprise a decryption key, the encryption key of the security framework, and metadata. The metadata may comprise instructions. The key container may comprise the content key associated with the secured content. The instructions may comprise an expression of a right of the secure media system to access the secured content. The key container may be encrypted, such as with a public key of a user device or of a device security module. The authorization endpoint may transmit the key container to the user device, the DRM system of the user device, or the device security module of the user device.

The secure media system may be configured to determine content on the user device. For example, the secure media system may be configured to auto-discover content on the user device. The user device may be configured to transmit an indication of content on the user device to the secure media system. The secure media system may indicate content available on the user device, such as by displaying an indication of the content on a user interface. The user device may push content, such as secured content, to the secure media system. The secure media system may be configured to indicate content available at the secure media system, such as by displaying an indication of the content available.

The secure media system may transmit a request for the secured content or for the content key associated with the secured content. For example, the secure media system may transmit a request for the secured content or for the content key associated with the secured content in response to a user request or user attempt to access the secured content via the secure media system. The secure media system may transmit the request to the user device, to the device security module, or to another component of the user device. The device security module may transmit an indication of the request to the authorization endpoint. In response to the device security module's communication, the authorization endpoint may indicate permissions of the secure media system to access the secured content or the content key. In response to the device security module's communication, the authorization may transmit the secured transcription structure to the user device, to the device security module, or to another component of the user device.

The device security module may receive or access the key container. The device security module may inspect the metadata of the key container, such as the instructions. The device security module may determine that the secure media system has been granted rights to use the content key or to access the secured content based on the instructions. Based on the instructions, the device security module may decrypt the secured content using the decryption key from key container. Based on the instructions, the device security module may re-encrypt the secured content with the encryption key of the secure media system. The device security module may release the re-encrypted secured content to the secure media system. The secure media system may manage the re-encrypted secured content. For example, the security framework may decrypt the re-encrypted secured content in a secure path, such as in a secured content processor. The secure media system may decrypt the re-encrypted secured content in an un-secure path, such as to an output device.

Based on the instructions, the device security module may encrypt the content key. For example, the device security module may encrypt the content key using the encryption key associated of the secure media system. As another example, the device security module may encrypt the content key using an encryption key from a key agreement algorithm, such as a public key exchange or a Diffie-Hellman key exchange, performed with the secure media system. As another example, the device security module may encrypt the content key using a public key of the secure media system. The secure media system may decrypt the content key with a private key paired to the public key and configured to decrypt data that has been encrypted with the public key.

The device security module may release the encrypted content key to the secure media system. The secure media system may decrypt the encrypted content key, such as using the encryption key associated with the secure media system or using the private key paired to the public key. The secure media system may use the decrypted content key to decrypt the secured content. The secure media system may manage the secured content and access the secured content, such as in a secure path or an un-secure path.

Figure 4:
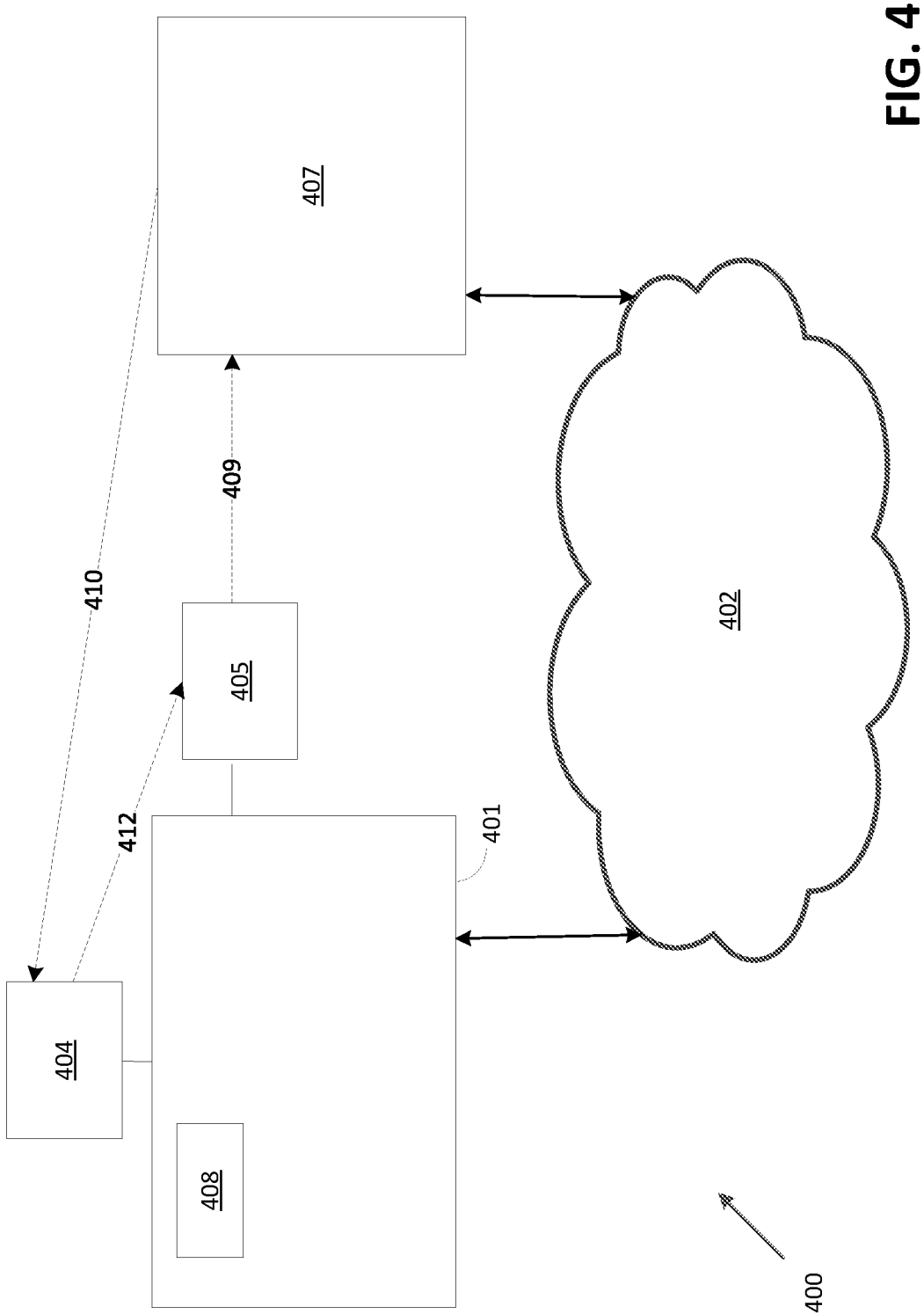
FIG. 4 shows an example system architecture.

FIG. 4 shows an example system 400. The system 400 may generally facilitate access to secured content on a user device 401. Access to the secured content may comprise play back, re-encoding, transcoding, sending, streaming, or storing the secured content, as examples. The secured content may comprise data. The secured content may comprise digital content. The secured content may comprise a content asset. The secured content may comprise, for example, Internet content, audio content, video content, computer executable programs, data files, electronic books, still images, and audio files. The secured content may comprise original content, such as content created by or on the user device 401 or by or on another user device. The secured content may be similar to unsecured content, but the secured content may comprise additional security features. For example, the secured content may be encrypted. The secured content may be associated with decrypted with a content key.

The user device 401 may be connected to a network 402. The network 402 may comprise a communication network, which may comprise portions of the Internet and other local or wide area networks. The network 402 may comprise a content delivery network. The network 402 may comprise a physical structure, such as a coaxial cable network, a fiber optic cable network, a hybrid fiber (coax and fiber) cable network, a telephone (land or cellular) network, and a satellite network.

The user device 401 may comprise a computing device. The user device 401 may comprise a personal computer, such as a desktop computer, a laptop computer, a tablet device, or a gateway device. The user device 401 may comprise a mobile phone or a personal data assistant. The user device 401 may comprise a set-top box or a television. The user device 401 may comprise or be associated with a digital video recorder. The user device 401 may comprise an Internet of Things ("IoT") device, such as an item with connectivity or computing capabilities. The user device 401 may comprise a client device.

The user device 401 may be configured to process secured content using a device security module 404. The device security module 404 may be similar to the device security module 104 in FIG. 1. The device security module 404 may be configured to manage content security. For example, the device security module 404 may manage the security of content on the user device 401, including content stored, received, streamed, or otherwise accessed by the user device 401.

The device security module 404 may comprise an alternative to software-based digital rights management (DRM) systems. The device security module 404 may comprise a hardware-implemented security module, such as a System on Chip ("SoC"). The device security module 404 may comprise a portable device. The portable device may comprise an interface configured to be coupled to the user device 401. The interface may comprise a universal serial bus ("USB"), ISO-7816 (smart card), IEEE-1394 (Fire Wire), payment card industry ("PCI"), PCI Express, Ethernet, or another interface format. The device security module 404 may comprise a software implemented security module, such as a whitebox software-based cryptographic module. The software-implemented security module may comprise firmware, such as software stored on read-only memory of the device. The firmware may be stored on the device may a manufacturer of the device. The device security module 404 may comprise secure processing capabilities. The device security module may comprise a device security module processor. The device security module processor may comprise a microprocessor or a programmable logic circuit. The device security module processor may be configured to execute instructions stored on a memory. The device security module 404 may comprise the memory. The memory may comprise a FLASH memory, a dynamic random-access memory (DRAM) memory, or another type of memory, for example. The device security module 404 may comprise or control a region of a memory of the user device 401, such as within a secure processor of the user device 401. For example, the device security module 404 may comprise a system on a chip (SOC) that controls the region of the memory. The region of the memory may not be shared with other systems of the user device 401. The device security module 404 may be integrated in a board of the user device 401 such that it may have access to a region of the memory, such as a restricted region of the memory. The restricted region of the memory may be physical protected. For example, the restricted region of the memory may not have circuitry to the rest of the user device 401. The restricted region of the memory may be password-restricted, such that a predetermined password must be used to access contents of the secure region of the memory. The device security module 404 may comprise or control an unsecured or unrestricted region of the memory. Contents of the region of the memory may be encrypted, such as with an encryption algorithm. A decryption key to decrypt the contents of the region of the memory may be coded into an operating code of the device security module 404.

The device security module 404 may be configured to manage secured content at the user device 401. Managing secured content at the user device 401 may comprise managing the playback, sending, storing or accessing of the secured content at the user device 401. The device security module 404 may be configured to cooperate with a secure media system 405 to manage the secured content. The secure media system 405 may comprise a security framework or secure content environment. The secure media system 405 may comprise a content management system, such as a content recording system. The secure media system 405 may be software-based or hardware-based. The secure media system 405 may comprise a device. The device may be in communication with the user device 401. For example, the device may comprise a set-top box, a digital video recorder (DVR) device, a playback device, a block box device, a white box device, a portable media player device, a gateway device, or a user device. The secure media system 405 may operate using a proprietary protocol, such as a content streaming protocol. Examples of proprietary protocols include Apple AirPlay, Roku, Amazon Fire, or Google Cast protocols. The proprietary protocol may comprise a proprietary encryption, transcoding, or re-encoding protocol, as examples. To illustrate, the secure media system 405 may be configured to stream the secured content stored on the user device 401, using a proprietary protocol, to another device.

At 409, the secure media system 405 may be configured to transmit a request to access secured content to an authorization endpoint 407. The request to access the secured content may comprise a request to playback, re-encode, transcode, send, stream, or store the secured content, as examples. The request may comprise a request to handle specific secured content. The authorization endpoint 407 may comprise a computing device, such as a server, a node, or a device similar to the licensing endpoint 103 in FIG. 1. The request may comprise identification information. The identification information may be associated with the user device 401, the secure media system 405, the device security module 404, a DRM system of the user device 401, or a user of the user device 401. The request may comprise decryption metadata. The metadata may comprise information associated with a decryption and encryption protocol of the secure media system 405. The metadata may comprise business metadata, such as a content class of the secured content that the secure media system 405 is requesting. The request may comprise an encryption key. The encryption key may be associated with the secure media system 405. The request may comprise an authentication mechanism, such as an identifier, a token, a digital signature, or a digital certificate of the secure media system 405. The request may comprise an indication of the secured content.

The authentication endpoint 407 may receive the request from the secure media system 405. The authentication endpoint 407 may identify the secure media system 405, such as by the authentication mechanism. The authentication endpoint 407 may authenticate the secure media system 405. For example, the authentication endpoint 407 may consult a database of authorized content systems. The authentication endpoint 407 may confirm that the secure media system 405 is indicated as an authorized system in the database. The authentication endpoint 407 may evaluate the security of the secure media system 405, such as based on the decryption and encryption protocol of the secure media system 405.

The authentication endpoint 407 may generate a secure transcription structure or a key container. The key container may comprise a decryption key, the encryption key of the secure media system 405, and metadata. The metadata may comprise instructions. The key container may comprise the content key associated with the secured content. The instructions may comprise an expression of a right of the secure media system 405 to access the secured content, such as to play back, re-encode, transcode, send, stream, or store the secured content, as examples. The instructions may comprise an indication of a right to re-encrypt secured content, such as with the encryption key associated with the secure media system 405. The instructions may comprise a type of access permitted, such as "access once" or "access freely". The key container may be encrypted, such as with a public key of the user device 401 or of the device security module 404. At 410, the access authorization endpoint 47 may transmit the key container to the user device 401, a DRM system of the user device 401, or the device security module 404. The user device 401 may access the key container. The user device 401 may receive the key container from the authentication endpoint 407. The user device 401 may store the key container. The device security module 404 may receive or access the key container. The device security module 404 may inspect the metadata of the key container, such as the instructions. The device security module 404 may determine that the secure media system 405 has been granted rights to use the content key or to access the secured content based on the instructions. Based on the instructions, the device security module 404 may decrypt the secured content using the decryption key from key container. Based on the instructions, the device security module 404 may re-encrypt the secured content with the encryption key of the secure media system 405. At 412, the device security module 404 may release the re-encrypted secured content to the secure media system 405. The secure media system 405 may manage the re-encrypted secured content. For example, the secure media system 405 may decrypt the re-encrypted secured content in a secure path, such as in a secured content processor. The secure media system 405 may decrypt the re-encrypted secured content in an un-secure path, such as to an output device. The secure media system 405 may decrypt the re-encrypted secured content in an output, such as to a display of the user device 401. The secure media system 405 may decrypt the re-encrypted secured content for output externally to the user device 401 or local to the user device 401. The secure media system 405 may decrypt the re-encrypted secured content for streaming or transferring securely within the secure media system 405. For example, the secure media system 405 may stream the re-encrypted secured content to another device, such as an authenticated device associated with the user device 401.

Figure 5:
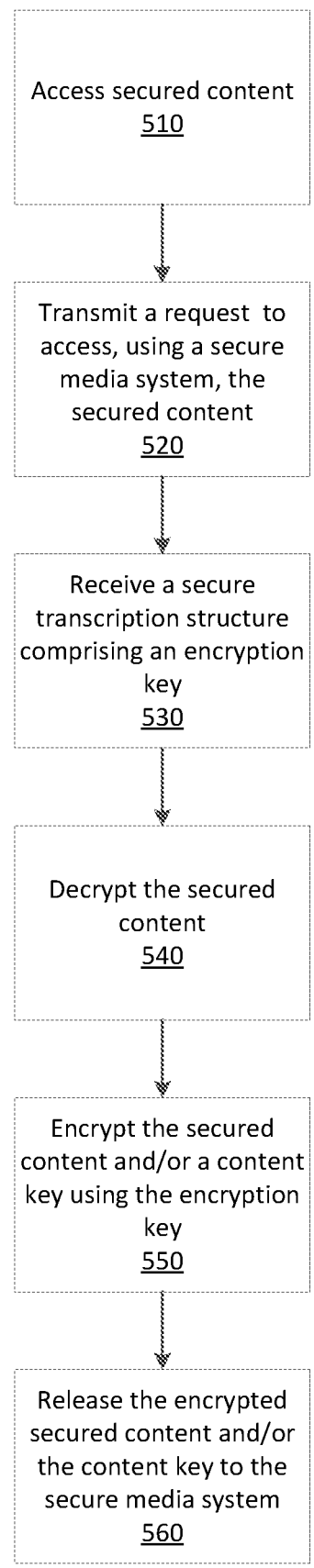
FIG. 5 shows a flow diagram of an example method.

FIG. 5 shows an example method for securely enabling a media system to access secured content from a device. At step 510, secured content may be accessed. Accessing secured content may comprise playing back, re-encoding, transcoding, sending, streaming, or storing the secured content, as examples. The secured content may comprise, for example, Internet content, audio content, video content, computer executable programs, data files, electronic books, still images, and audio files. The secured content may comprise original content, such as content recorded at a user device, such as the user device 401 in FIG. 4. The secured content may comprise security features. For example, the secured content may be encrypted.

The secured content may be accessed by a user device (e.g., the user device 401 in FIG. 4). Accessing the secured content may comprise receiving the secured content. The secured content may be received from a computing device, such as a content server. The secured content may be received over a network, such as a communication network or a content delivery network. Accessing the secured content may comprise retrieving the secured content at a storage location, such as a server, a database, or a cache.

The secured content may be accessed by a device security module of the user device (e.g., the device security module 404 in FIG. 4). The device security module may be coupled to a computing device, like the user device 401 in FIG. 4. The device security module may manage content security on the computing device, including content stored, received, or accessed by the computing device.

The device security module may comprise an alternative to software-based digital rights management (DRM) systems. The device security module may comprise a hardware-implemented security module, such as a System on Chip ("SoC"). The device security module may comprise a portable device. The portable device may comprise an interface configured to be coupled to the computing device. The interface may comprise a universal serial bus ("USB"), ISO-7816 (smart card), IEEE-1394 (Fire Wire), payment card industry ("PCP"), PCI Express, Ethernet, or another interface format. The device security module may comprise a software implemented security module, such as a whitebox software-based cryptographic module. The software-implemented security module may comprise firmware, such as software stored on read-only memory of the device. The device security module may be associated with a unique identification value and one or more keys for encryption and secure signing.

The device security module may comprise secure processing capabilities. The device security module may comprise a device security module processor. The device security module processor may comprise a microprocessor or a programmable logic circuit. The device security module processor may be configured to execute instructions stored on a memory. The device security module may comprise the memory. The device security module may comprise a secure region of memory of the user device. Access to the secure region of memory may be restricted. For example, access to the secure region of memory may be password-restricted, such that a predetermined password must be used to access contents of the secure portion of memory. Contents of the secure region of memory may be encrypted, such as with an encryption algorithm. A password or decryption key to access the secure region of the memory may be coded into an operating code of the device security module.

The device security module may manage secured content access at the computing device. The secured content access may comprise play back, re-encoding, transcoding, sending, streaming, or storing of the secured content, as examples. The device security module may cooperate with a secure media system to manage access to secured content on the computing device. The secure media system may comprise a recording system, such as a recording system on the computing device. The secure media system may comprise a content security system.

At step 520, a request to access the secured content using the secured media system may be sent. The request to access the secured content may comprise a request to play back, re-encode, transcode, send, stream, or store, the secured content, as examples. The request may be sent by the secure media system. The request may be sent to a computing device, like the authorization endpoint 407 in FIG. 4. The request may comprise decryption information. The decryption information may comprise metadata. The metadata may describe the decryption and encryption protocol of the secure media system. The request may comprise an encryption key. The encryption key may be associated with the secure media system. The request may comprise an authentication mechanism to allow authentication of the secure media system. The secure media system may transmit a request for the secured content or for the content key associated with the secured content to the device security module. The device security module may transmit an indication of the request to the authorization endpoint. The device security module may authenticate the security framework, such as in response to the request. At step 530, a key container may be received. The key container may be received by the computing device or the device security module. The key container may be received from the computing device that received the request from step 520. The key container may comprise a decryption key. The decryption key may be configured to decrypt the secured content. The key container may comprise the encryption key provided by the security framework. The key container may comprise instructions. The instructions may comprise an indication of a right to access secured content. The instructions may comprise an indication of a right to re-encrypt secured content, such as with the encryption key associated with the security framework. The instructions may comprise a type of access permitted, such as "access once" or "access freely". The key container may be encrypted, such as with a public key of the computing device or of a device security module.

The device security module may access the key container. The device security module may inspect the key container. The device security module may extract the instructions from the key container. The decryption key may be isolated to the device security module. For example, the decryption key may be isolated from the security framework.

At step 540, the secured content may be decrypted. The device security module may decrypt the secured content. The device security module may decrypt the secured content using the decryption key. The device security module may decrypt the secured content using a secured content processor of the computing device. For example, the device security module may securely transmit the secured content and the decryption key to the secured content processor. The device security module may securely transmit the instructions from the key container to the secured content processor.

At step 550, the secured content may be re-encrypted. The device security module may re-encrypt the secured content. The secured content may be re-encrypted using the encryption key. The device security module may re-encrypt the secured content using the secured content processor of the computing device. The re-encrypted secured content may comprise a transcription content.

Based on the instructions, the device security module may encrypt the content key. For example, the device security module may encrypt the content key using the encryption key associated of the secure media system. As another example, the device security module may encrypt the content key using an encryption key from a key agreement algorithm, such as a public key exchange or a Diffie-Hellman key exchange, performed with the secure media system. As another example, the device security module may encrypt the content key using a public key of the secure media system. The secure media system may decrypt the content key with a private key paired to the public key and configured to decrypt data that has been encrypted with the public key.

At step 560, the re-encrypted secured content may be released to the secure media environment. The re-encrypted secured content may be released by the device security module. Releasing the re-encrypted secured content may comprise transmitting the re-encrypted secured content or allowing access to the re-encrypted secured content. The security framework device may store the re-encrypted secured content. The security framework may manage the re-encrypted secured content. The security framework may decrypt the re-encrypted secured content in the device security module. The secure media system may decrypt the re-encrypted secured content. The secure media system may decode the secured content.

The encrypted content key may be released to the secure media system. The device security module may release the encrypted content key to the secure media system. The secure media system may decrypt the encrypted content key, such as using the encryption key associated with the secure media system or using the private key paired to the public key. The secure media system may use the decrypted content key to decrypt the secured content. The secure media system may manage the secured content and access the secured content, such as in a secure path or an un-secure path. Accessing secured content may comprise playing back, re-encoding, transcoding, sending, streaming, or storing the secured content, as examples.

As an illustrative example, a user may want to watch an episode of a show on a tablet device. The episode may be stored on a display device, such as a set top box. The episode may be stored in a cache, a dynamic random-access memory (DRAM), or a FLASH memory of the display device. The display device may comprise a device security module, such as software installed on the display device. The device security module may manage a content key to decrypt the episode. The episode may be streamed to display device, such as from a content endpoint. A tablet device may be in communication with the display device. The tablet device and the display device may communicate to transmit indications of content available on at least one of the devices. The tablet device may output an indication of the episode. The tablet device may comprise a secure media system, such as a media player application. The user may attempt to access the episode in the media player application on the tablet device. The display device may access a key container, such as from a content licensing system. The key container may comprise instructions indicating that the tablet device or the media player application has rights to access the episode. The device security module of the display device may determine, using the instructions, that the tablet device or the media player application has rights to access the episode. The instructions may originate from a content licensing system. The instructions may comprise an encryption key to re-encrypt the episode. The encryption key may be associated with the media player application on the tablet device.

The device security module of the set top box may decrypt the encrypted episode using the content key. The device security module may re-encrypt the episode using the provided encryption key. The device security module may transmit the re-encrypted episode and the encrypted content key to the tablet device. The media player application of the tablet device may decrypt the episode, such as using a key that is associated with the encryption key from the key container. The key may comprise a private key or a secret decryption key that is only known to the tablet device or the media player application. The media player application may output the episode and the viewer may watch the episode on the tablet device.

Figure 6:
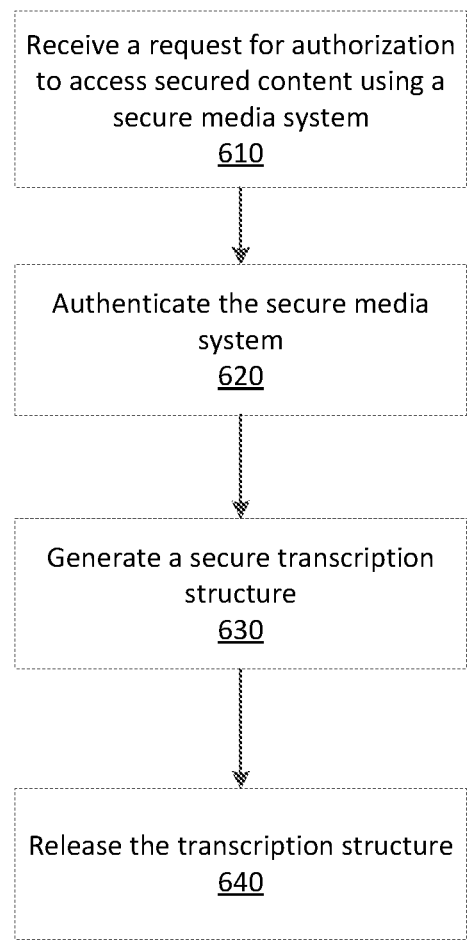
FIG. 6 shows a flow diagram of an example method.

FIG. 6 shows an example method. At step 610, a request may be received for authorization to access secured content. The request to access the secured content may comprise a request to play back, re-encode, transcode, send, stream, or store, the secured content, as examples. The request may comprise a request for a secure media system to access the secured content. The request may be received at a computing device. The computing device may comprise an authorization endpoint.

The request may comprise identification information. The identification information may be associated with a computing device, the secure media system, a device security module, or a user. For example, the identification information may comprise a name, model number, serial number, or a key. The request may comprise decryption information. The decryption information may comprise metadata. The metadata may describe the decryption and encryption protocol of the secure media system. The request may comprise an encryption key. The encryption key may be unique to the secure media system. For example, a key configured to decrypt content encrypted using the encryption key may be private to the secure media system. The request may comprise an indication of the secured content, such as a name or a code of the secured content. The request may comprise an authentication mechanism to allow authentication of the secure media system, such as a unique identifier, a token, a digital signature, or a digital certificate.

At step 620, the secure media system may be authenticated. The computing device may authenticate the secure media system. Authenticating the secure media system may comprise determining that the secure media system or an entity associated with the secure media system has rights or should have rights to access the secured content.

Authenticating the secure media system may comprise requiring the security framework to perform a challenge or transmit a password, for example. Authenticating the secure media system may comprise using a database of authorized security frameworks. The identification information from the request may be located in the database. The computing device may confirm that the secure media system is recorded as an authorized secure media system in the database.

Authenticating the secure media system may be based on the authentication mechanism transmitted in the request. For example, authenticating the security framework may be based on use of a private key or a public key, such as to encrypt the request, wherein the private key or the public key may be associated with or known by one or more entities that have been determined to be permitted to access the secured content. Authenticating the security framework may be based on a digital certificate, such as of the secure media system. The digital certificate may be issued by a trusted third party who authenticates the secure media system or verifies that the secure media system is associated with a particular entity. The digital certificate may be used to determine that the secure media system comprises a framework that is permitted to access the secured content.

The security of the secure media system may be evaluated to determine to authenticate the secure media system. For example, the indication of the encryption and decryption protocol in the request may be used to determine to authenticate the secure media system. The identification of a device associated with the secure media system may be used to determine authenticate the secure media system, such as based on a version of software or hardware installed on the device.

At step 630, a key container may be generated. The key container may be generated by the computing device. The key container may be generated, based on the request or based on the authentication of the secure media system, for example. The key container may comprise a decryption key. The decryption key may be configured to decrypt the secured content. The key container may comprise the encryption key provided by the security framework. The key container may comprise instructions. The instructions may comprise an indication of a right to access secured content, such as to play back, re-encode, transcode, send, stream, or store the secured content. The instructions may comprise an indication of a right to re-encrypt secured content, such as with the encryption key associated with the security framework. The instructions may comprise a type of access permitted, such as "access once" or "access freely". The key container may be encrypted, such as with a public key of the computing device or of a device security module.

At step 640, the key container may be released. The key container may be released, based on the request or the authentication of the secure media system, for example. Releasing the transcription structure may comprise transmitting the key container. The key container may be sent to a computing device or a device security module. Releasing the key container may comprise making the key container available to access. For example, the key container may be made available for access at a storage location, such as a database, a cache, or a server.

As an illustrative example, A DRM server may receive a request to record a news program from a digital video recorder (DVR). The request may comprise decryption information. The decryption information may comprise metadata. The metadata may describe the decryption and encryption protocol of a security framework of the DVR. The request may comprise an identification of the news program. The request may comprise an encryption key associated with the security framework. The request may comprise an identifier of the DVR. The DRM server may authenticate the security framework by querying a database of authenticated security frameworks. The DRM server may create a key container. The key container may comprise instructions expressing a right for the DVR to record the news program. The key container may comprise a content key to decrypt the news program and the encryption key associated with the framework. The digital rights manager may transmit the key container to a device security module on the DVR.

Figure 7:
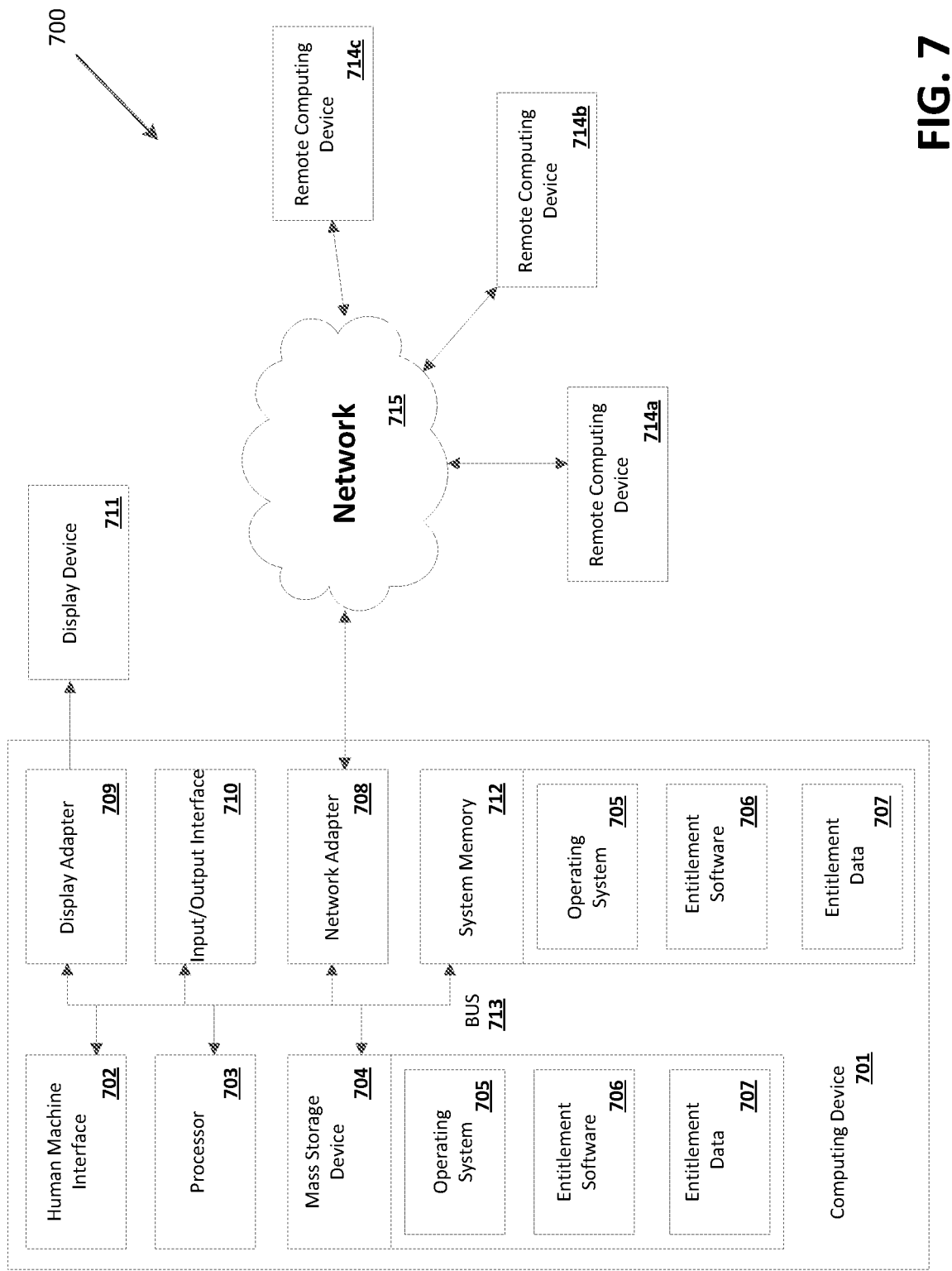
FIG. 7 shows an example system environment.

FIG. 7 shows a block diagram illustrating an exemplary operating environment 700 for performing the disclosed methods of managing digital rights. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 701. The components of the computing device 701 may comprise, but are not limited to, one or more processors or processing units 703, a system memory 712, and a system bus 713 that couples various system components including the processor 703 to the system memory 712. In the case of multiple processing units 703, the system may utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description may also be implemented over a wired or wireless network connection and each of the subsystems, including the processor 703, a mass storage device 704, an operating system 705, entitlement software 706, entitlement data 707, a network adapter 708, system memory 712, an Input/Output Interface 710, a display adapter 709, a display device 711, and a human machine interface 702, may be contained within one or more remote computing devices 714a,b,c at physically separate locations, connected through buses of this form, in effect implementing a fully distributed system.

The computing device 701 typically comprises a variety of computer readable media. Exemplary readable media may be any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as entitlement data 707 and/or program modules such as operating system 705 and entitlement software 706 that are immediately accessible to and/or are presently operated on by the processing unit 703.

In another aspect, the computing device 701 may also comprise other removable/non-removable, volatile/non-volatile computer storage media. By way of example, FIG. 7 illustrates a mass storage device 704 which may provide non-volatile storage of computer code, computer readable instructions, data structures, program modules, and other data for the computing device 701. For example and not meant to be limiting, a mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 704, including by way of example, an operating system 705 and entitlement software 706. Each of the operating system 705 and entitlement software 706 (or some combination thereof) may comprise elements of the programming and the entitlement software 706. Entitlement data 707 may also be stored on the mass storage device 704. Entitlement data 707 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another aspect, the user may enter commands and information into the computing device 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 703 via a human machine interface 702 that is coupled to the system bus 713, but may be connected by other interface and bus structures, such as a parallel port, game port, an IEEE 1394 Port (also known as a Firewire port), a serial port, or a universal serial bus (USB).

In yet another aspect, a display device 711 may also be connected to the system bus 713 via an interface, such as a display adapter 709. It is contemplated that the computing device 701 may have more than one display adapter 709 and the computing device 701 may have more than one display device 711. For example, a display device may be a monitor, an LCD (Liquid Crystal Display), or a projector. In addition to the display device 711, other output peripheral devices may comprise components such as speakers (not shown) and a printer (not shown) which may be connected to the computing device 701 via Input/Output Interface 710. Any step and/or result of the methods may be output in any form to an output device. Such output may be any form of visual representation, including, but not limited to, textual, graphical, animation, audio, tactile, and the like. The display 711 and computing device 701 may be part of one device, or separate devices.

The computing device 701 may operate in a networked environment using logical connections to one or more remote computing devices 714a,b,c. By way of example, a remote computing device may be a personal computer, portable computer, a smart phone, a server, a router, a network computer, a peer device or other common network node, and so on. Logical connections between the computing device 801 and a remote computing device 714a,b,c may be made via a network 715, such as a local area network (LAN) and a general wide area network (WAN). Such network connections may be through a network adapter 708. A network adapter 808 may be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of entitlement software 706 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
    transmitting, by a computing device and to an authorization device, a request for authorization for a secure media system to access secured content;
    receiving a key container associated with copying the secured content, wherein the key container comprises an encryption key associated with the secure media system and an indication of a permission for the secure media system to access the secured content;
    decrypting, by a device security module of the computing device and based on the indication of the permission, the secured content using a content key, wherein the content key is isolated to the device security module;
    encrypting, by the device security module and using the encryption key, the secured content; and
    routing, by the device security module and to the secure media system, the secured content.

2. The method of claim 1, wherein the secure media system comprises at least one of a playback device, a digital video recorder (DVR) device, a white box device, and a content management system.

3. The method of claim 1, wherein the key container is encrypted; and
    wherein the method further comprises decrypting, by the device security module and using a decryption key isolated to the device security module, the encrypted key container.

4. The method of claim 1, wherein the content key isolated to the device security module comprises the content key stored to a restricted memory, wherein the device security module has access to the restricted memory.

5. The method of claim 1, wherein the key container further comprises one or more conditions for accessing the secured content; and
    wherein the method further comprises determining, by the device security module, compliance with the one or more conditions for accessing the secured content.

6. The method of claim 5, wherein the encrypting the secured content is based at least on the determination of the compliance with the one or more conditions for copying the secured content.

7. A method comprising:
    receiving, by a computing device and from a user device, a request to copy secured content using a secure media system;
    determining that the secure media system is authenticated to access the secured content;
    generating, based on the determining that the secure media system is authenticated, a key container, wherein the key container comprises an encryption key associated with the secure media system and an indication of a right of the secure media system to access the secured content; and
    transmitting, to the user device, the key container.

8. The method of claim 7, wherein the request comprises an indication of a device security module of the computing device; and
    wherein the generating the key container is further based on a determination that the device security module complies with content security criteria.

9. The method of claim 7, wherein the computing device comprises a device security module; and
    wherein the generating the key container comprises encrypting, using a key associated with the device security module, at least a portion of the key container.

10. The method of claim 7, wherein the request comprises an indication of a content security protocol of the secure media system; and
    wherein the determining that the secure media system is authenticated is based at least on the content security protocol of the secure media system.

11. The method of claim 7, wherein the request comprises at least one of a token, a digital signature, or a digital certificate of the secure media system; and
    wherein the determining that the secure media system is authenticated to access the secured content is based on authentication of the at least one of the token, the digital signature, or the digital certificate.

12. The method of claim 7, wherein the determining that the secure media system is authenticated to access the secured content is based on a database of authenticated secure media systems.

* * * * *